Aug. 23, 1955 E. A. MALICK ET AL 2,715,815
RESONANCE DETECTOR FOR JET ENGINES
Filed Aug. 13, 1951 3 Sheets-Sheet 1

INVENTORS.
E. A. MALICK
D. R. DE BOISBLANC
BY
Hudson + Young
ATTORNEYS

Aug. 23, 1955  E. A. MALICK ET AL  2,715,815
RESONANCE DETECTOR FOR JET ENGINES
Filed Aug. 13, 1951   3 Sheets-Sheet 2

INVENTORS.
E. A. MALICK
D. R. DE BOISBLANC
BY
Hudson + Young
ATTORNEYS

Aug. 23, 1955           E. A. MALICK ET AL           2,715,815
                RESONANCE DETECTOR FOR JET ENGINES
Filed Aug. 13, 1951                              3 Sheets-Sheet 3

AVERAGE ENERGY
IS ZERO

INVENTORS.
E. A. MALICK
D. R. DE BOISBLANC
BY
Hudson & Young
ATTORNEYS

United States Patent Office 2,715,815
Patented Aug. 23, 1955

2,715,815

RESONANCE DETECTOR FOR JET ENGINES

Emil A. Malick and Deslonde R. de Boisblanc, Bartlesville, Okla., assignors to Phillips Petroleum Company, a corporation of Delaware Application August 13, 1951, Serial No. 241,642

10 Claims. (Cl. 60—39.28)

This invention relates to a system for indicating the presence of undesirable periodic movements or variations of flame intensity in a reaction motor, and for controlling an operating variable of the motor so as to prevent occurrence of resonance conditions resulting from such periodicity. In another aspect, it relates to a circuit for sensing periodicity in a series of normally random electrical pulses.

In reaction motors wherein a mixture of fuel and air is burned to produce a flame, and the products of combustion are ejected in a backward direction thereby to provide a forward propulsive thrust, the flame intensity continuously varies as the motor is operated. Such variations ordinarily occur in a random manner, that is, there is no fixed relationship between the occurrence of peak intensity periods of the flame. However, under certain conditions, there may be a periodicity in the variations in flame intensity. That is, the peak periods of flame intensity may occur at regular intervals, the frequency of occurrence, however, being variable over wide limits. This condition can result in the setting up of resonance conditions in parts of the motor or aircraft carrying same and, if resonance conditions continue over a substantial period, extremely undesirable effects upon operation of the aircraft may be produced. For example, the flame may be extinguished and the motor may stop operation or, alternatively, sympathetic vibrations may be set up in various parts of the aircraft structure with resultant production of deleterious mechanical strains. The condition of resonance may produce harmful effects even though the periodic excitation causing it is produced by a flame of normal length, and this invention is, therefore, to be distinguished from control systems wherein a flame of greater than normal length is produced under certain operating conditions. The elongated flame may damage the parts of the turbine system, in the case of a turbojet engine, or it may produce destructive effects in the flame holder structure in the case of a ram jet. These effects, of course, are different than the harmful effects produced by resonance, as previously discussed.

It is an object of this invention to provide a system for detecting periodicity in a practical and simple manner.

It is a further object to provide a system for controlling an operating variable of the reaction motor so as to suppress periodic flame variations resulting in resonance.

It is a still further object to provide an electrical circuit of novel construction to detect the presence of periodicity in a series of input electrical pulses fed to the circuit.

Various other objects, advantages and features of the invention will become apparent from the following detailed description taken in conjunction with the accompanying drawings, in which.

Figure 1:
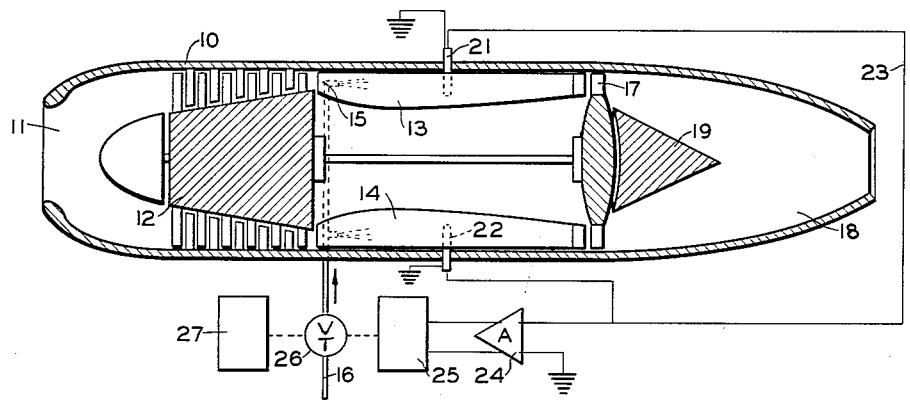
Figure 1 is a schematic view of a turbojet utilizing the control system of this invention.

Referring now to the drawings in detail and particularly to Figure 1, we have shown a turbojet comprising a generally cylindrical shell 10 having an air intake section 11 which feeds air to a compressor 12. Compressed air from the unit 12 is passed through suitable combustion chambers, two of which are indicated at 13 and 14, wherein the air is mixed with fuel passing through spray nozzles 15 from a fuel line 16. The mixture of fuel and air is ignited in the combustion chambers and the products of combustion are directed against the blades of a turbine 17 from which they flow through a discharge section 18 to the atmosphere. A diffuser 19 is mounted within outlet section 18 to properly direct the flow of combustion gases, and the turbine 17 is coupled to compressor 12 by a shaft 20.

In operation, the products of combustion issuing from the outlet section 18 in a rearward direction produce a reaction upon the motor resulting in a forward propulsive thrust, the products of combustion also serving to operate turbine 17 which supplies driving energy to compressor 12 through shaft 20.

In accordance with the invention, a detector is placed in one or more selected combustion chambers at a position where flame is present during normal operation of the motor, this detector producing an electrical output which is representative of flame intensity. The detector produces a high electrical output when a flame is incident thereon, and a low or zero output when a flame is not incident thereon. Further, when the detector is in the flame zone, the output is roughly proportional to flame intensity. The phrase "output representative of flame intensity" is intended to embrace either or both types of output variation of the detector in response to the impingement of a flame thereon. In the embodiment illustrated, combustion chambers 13, 14 are provided with the respective detectors 21 and 22 which are connected through ground and a lead 23 to an amplifier 24, the output of which is fed to a periodicity sensing circuit 25 controlling a suitable operating variable of the motor. In the example shown, the output of unit 25 controls a valve 26 in the fuel line so as to reduce the amount of fuel supplied when periodic variation in flame intensity occur, the control of valve 26 by unit 25 overriding the normal control of the valve by throttle device 27.

Figure 3:
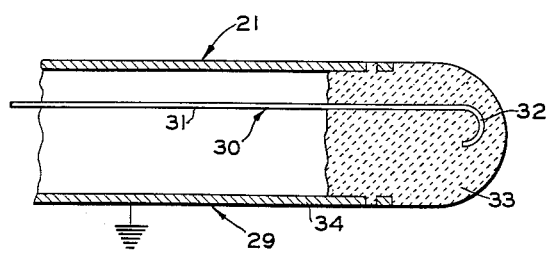
Figure 3 is a sectional view of a detector.

As shown in Figure 3, each of the detectors 21, 22 comprises a pair of spaced electrodes 29, 30. Electrode 30 is a metal wire 31 having a hook-shaped end portion 32 embedded in a rounded head 33 of refractory material. Electrode 29 is a cylindrical sleeve 34 of metal or refractory material secured to the inner edge of the rounded head 33. When a flame impinges upon the detector, an electrical output appears between electrodes 29, 30 due to the ionization effects produced by the flame. The construction and operation of the detector are described in more detail by the copending application of Deslonde R. de Boisblanc, S. N. 220,113, filed April 9, 1951, entitled Detecting Device.

Figure 6A:
Figures 6a to 6r, inclusive, are graphs showing the wave forms appearing at various parts of the circuit of Figure 5.
Figure 6H:
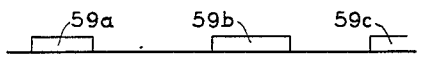
Figure 6B:
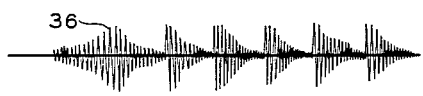

As previously indicated, during normal operation of the reaction motor, the periods of peak flame intensity occur at random intervals, the electrical output having the appearance represented by graph 35, Figure 6a. When a condition of flame periodicity occurs in any combustion chamber provided with a detector, the periods of peak flame intensity occur at regular intervals, and the output of the detector is of the wave form generally indicated by graph 36, Figure 6b. Under the latter conditions, but not under the former, an electrical output is produced by periodicity sensing device 25 which actuates valve 26 so as to decrease the amount of fuel fed to the motor until the periodic condition is suppressed, this action overriding the normal control of the fuel supply provided by unit 27.

Although we do not wish to be bound by any theory of the invention, we believe that periodic variations in flame intensity act as an exciting source which is capable of producing resonance in parts of the motor or system having a natural mode or frequency of vibration at a frequency close to that of the exciting source. Also, there appears to be a "feedback" effect so that an amplifying property exists in the system aggravating any periodic process which may be started therein.

Also, there is a time lag between the onset of the periodic variation in intensity of the flame and the time at which resonances resulting therefrom become dangerous, the extent of such time lag being determined by an empirical factor representing the closeness of coupling between the exciting system, i. e., the flame, and the excited system, i. e., the part of the motor or aircraft in which the resonance occurs. This time lag enables the condition of periodicity to be stopped before undesirable resonance conditions result therefrom.

Figure 2:
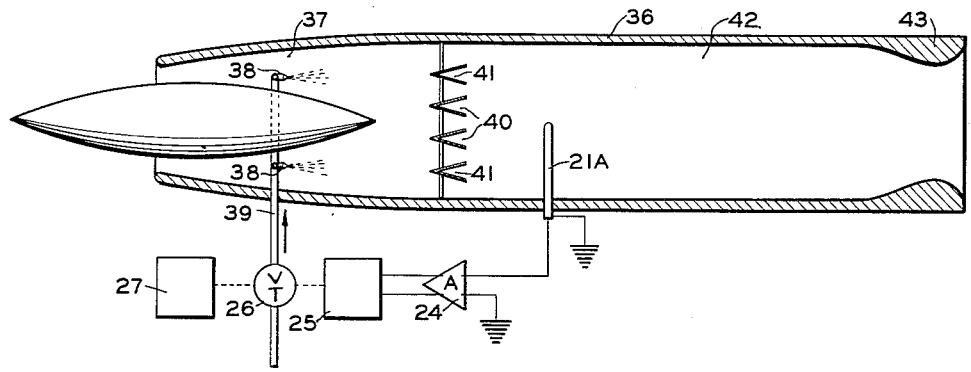
Figure 2 is a view of a ram jet utilizing the principles of our invention.

In Figure 2, we have illustrated the application of the invention to a ram jet which includes a shell 36 of generally cylindrical configuration having an inlet section 37 to which fuel is fed through nozzles 38 from a line 39. The mixture of fuel and air undergoes combustion and passes through a flame holder composed of two concentric fluted rings 40 and 41 to an enlarged extension 42 of the combustion chamber. The products pass to the atmosphere in a rearward direction through a reduced portion 43 of the extension and thereby produce a forward propulsive thrust by their reaction upon the motor. A detector 21a similar to that illustrated in Figure 3 is mounted in the extension 42 at a position where flame is present during normal operation of the motor. The detector is connected to the amplifier 24, a periodicity sensing device 25, and a valve 26 in the fuel line in the manner shown by Figure 1, manual control of the fuel valve 26 being provided by a unit 27.

As explained in connection with Figure 1, when periodicity occurs, that is, when the flame front moves so as to engage and be removed from the detector in a periodic manner, or when periodic variations in intensity occur with the detector continuously positioned in the flame, unit 25 produces an output which regulates valve 26 to decrease the amount of fuel supplied to nozzles 38 until the condition of periodicity is suppressed.

Figure 4:
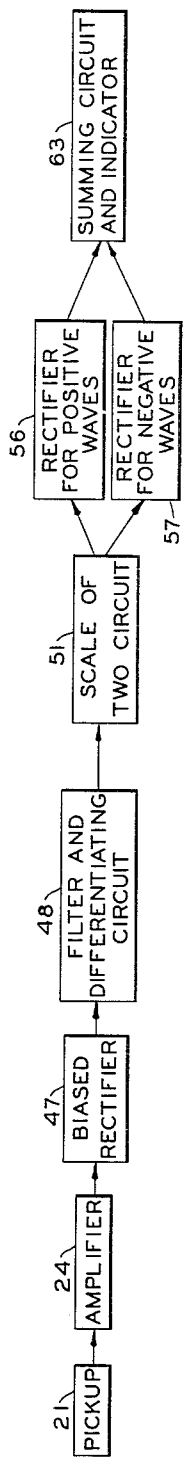
Figure 4 is a block diagram of our novel circuit for detecting periodicity.
Figure 6I:
Figure 6C:
Figure 6K:
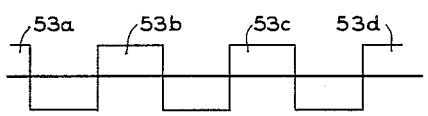
Figure 6D:
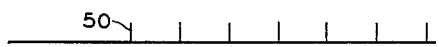

In Figure 4, we have shown, in block diagram, a novel circuit for sensing periodicity in the electrical output of the detector. Although described in connection with the control of reaction motors, the circuit has independent application in other fields as those skilled in the art will understand. In this circuit, the output of detector 21 is fed through amplifier 24 and, thence, successively to biased rectifier 47 and to filter and differentiating circuit 48. The function of these circuits is to transform the waves 35 and 36, Figures 6a, 6b to sharp exponential pulses 49, 50 as shown in Figures 6c, 6d. In some cases, the rectifier 47 is sufficient to perform this function and the unit 48 may be omitted. Where the use of such a filter and differentiating circuit is desirable, it may be of the type shown in Patent No. 2,448,322 to R. G. Piety, entitled Detonation Meter, or of the type shown in Patent No. 2,448,323 to D. R. De Boisblanc, entitled Detonation Meter. It will be noted that these circuits produce a sharp pulse at each period 35, 36 of peak flame intensity. Where the periods of peak flame intensity occur at random intervals, the pulses 49, Figure 6c, are likewise at random intervals and, where the flame variations are regular or periodic, the corresponding pulses 50 likewise occur in a periodic manner.

Figure 6M:
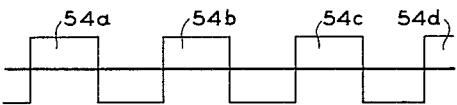
Figure 6E:
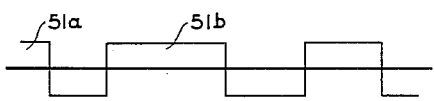

The pulses 49 or 50 are fed to a scale of two circuit 51 wherein alternate pulses produce and terminate rectangular waves appearing at the output of the circuit. Referring to Figures 6c and 6e, it will be noted that the first pulse 49 terminates a rectangular wave 51a, the second pulse 49 initiates a rectangular wave 51b, and the third pulse 49 terminates rectangular wave 51b. Thus, each successive pair of pulses 49 produces a rectangular voltage wave, the duration of which is equal to the interval between such pair of pulses. Scale of two circuit 51 also produces a series of rectangular waves 52a, 52b which are of the same form as the waves 51a and 51b, but of opposite polarity. Thus, rectangular wave 52a occupies the interval between rectangular waves 51a, 51b and rectangular wave 52b occupies at the interval between rectangular wave 51b and the next succeeding wave of the series. It will be noted that the waves of Figures 6e and 6f were produced between pulses 49 of random spacing. Accordingly, the waves 51a, 51b—52a and 52b are, in general, of different duration. However, where the input to the scale of two circuit is periodic, as illustrated by pulses 50, Figure 6d, the scale of two circuit produces two sets 53a to 53d and 54a to 54d which are all of the same duration although, of course, the waves of the series will have a uniform duration which varies in accordance with the frequency of the incoming pulses.

Referring again to Figure 4, one set of waves is fed through a rectifier 56 and the other set of waves of opposite polarity is fed through a rectifier 57. Where the input consists of random pulses 49, the output of rectifier 56 is as shown by Figure 6g, a rectangular wave 58 being produced which corresponds with the positive portions 51a, 51b of the rectangular waves shown in Figure 6e. The output of rectifier 57 is a series 59 of positive rectangular waves corresponding to the positive portions of rectangular waves 52a and 52b, Figure 6f. Where the input pulses have random spacing, the width of the rectangular waves 58, 59 varies in an irregular manner. However, where the input consists of uniformly spaced pulses 50, the output of rectifier 56 is a set 60 of uniformly spaced positive rectangular waves corresponding to the positive portions of the waves 53, Figure 6k, while the output of detector 57 is a set of uniform positive rectangular waves 61 corresponding to the positive portions of waves 54, Figure 6m, having the same duration as the waves 60, Figure 6m.

The output of rectifiers 56, 57 is fed to a summing circuit and indicator 63 which produces an output representative of the relative duration of the two sets of rectangular voltage waves fed thereto. Where the input consists of random pulses 49, the summing circuit produces an output represented in Figure 6i by a wave 64a equal to the difference in energy between waves 58a and 59a together with a wave 64b representing the difference in energy between waves 58b and 59b. As long as the waves 58, 59 are of unequal duration, energy will be fed to the circuit 63 which can be utilized, for example, to maintain a relay in an actuated condition. However, where the input pulses are uniformly spaced, as in Figures 6a and 6p, the energy fed to the circuit during each cycle is zero so that, if the output of the circuit is fed to a relay, it will become de-energized. The de-energization of the relay can be used, in a well understood fashion, to control the fuel supply to a reaction motor, or other suitable operating variable of the system.

Figure 5:
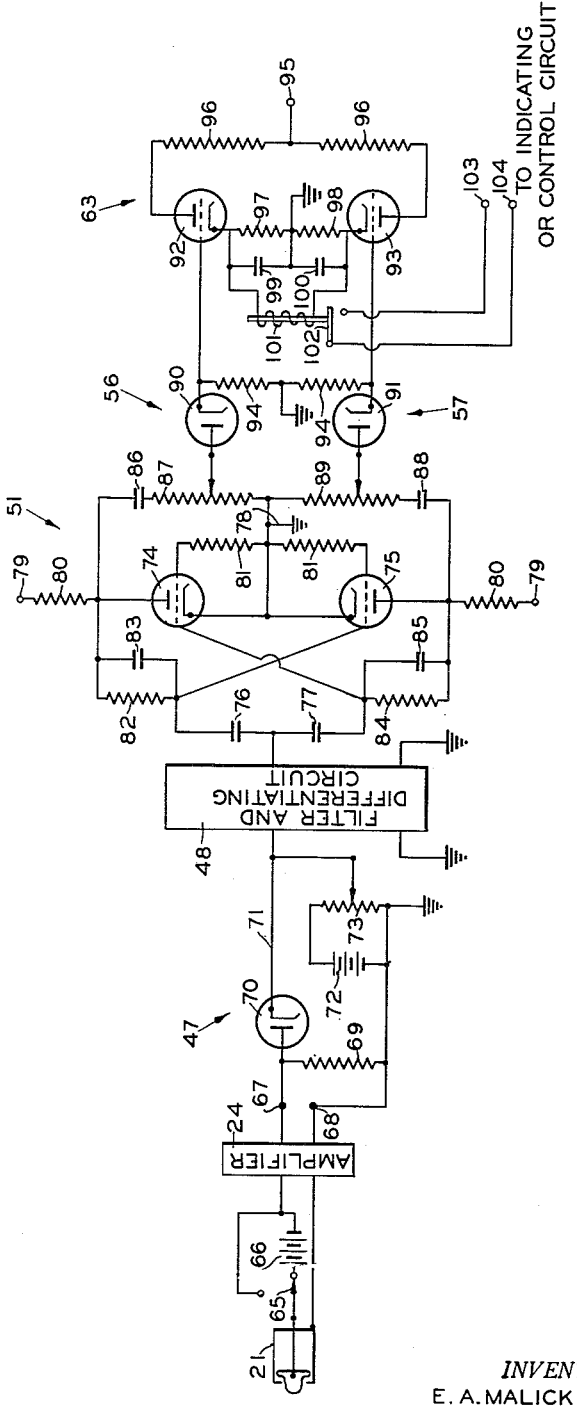
Figure 5 is a schematic circuit diagram of one embodiment of the block diagram of Figure 4.

In Figure 5, we have shown a suitable circuit which is a preferred embodiment of the block diagram of Figure 4. The construction of pickup 21 is similar to that shown in Figure 3 and requires no further discussion. A switch 65 is provided in the pickup circuit so that the output thereof can be fed through a battery 66 to the amplifier 24, or alternatively, directly to the amplifier without the intervention of the battery. As disclosed in the copending application by D. R. de Boisblanc, Serial No. 220,113, entitled Detecting Device, the use of a battery is very advantageous in some cases to increase the amplitude of the pickup signal. Amplifier 24 is conventional and need not be described in detail.

The biased rectifier 47 includes input terminals 67, 68 fed by the output of amplifier 24, these terminals being shunted by a fixed resistance 69. Terminal 67 is connected through a diode 70 and a lead 71 to one input terminal of filter and differentiating circuit 48, the other terminal 68 being grounded. The cathode of diode 70 is biased by a battery 72 shunted by a potentiometer 73, the contactor of potentiometer being connected to lead 71. The function of circuit 47 is to pass only signals of greater than a predetermined amplitude, as determined by the setting of potentiometer 73. In some cases, by eliminating all signals of less than a predetermined amplitude, the waves 35, 36, Figures 6a and 6b, can be transformed directly into pulses having the wave forms shown in Figures 6c and 6d. In other cases, it is desirable to utilize a filter and differentiating circuit 48 as described in the patents previously identified.

Scale of two circuit 51 includes two electron tubes 74 and 75 each having an anode, a cathode, and a control grid. The output of circuit 48 is fed directly to both control grids through coupling condensers 76 and 77, the cathodes of both tubes being grounded at 78 and the anodes being supplied with operating potentials from positive power supply terminals 79 through separate voltage dropping resistors 80. Each tube is further provided with a grid resistance 81. The anode of tube 74 is connected to the control grid of tube 75 through a resistance-capacitance unit 82, 83 while the anode of tube 75 is connected to the control grid of tube 74 by a resistance-capacitance unit 84, 85. The anode circuit of tube 74 further includes a coupling condenser 86 and a potentiometer 87 while the anode circuit of tube 75 further includes a coupling condenser 88 and a potentiometer 89.

Assuming that tube 74 is conductive and tube 75 is non-conductive, the first positive pulse upon the grid of tube 75 causes this tube to become conductive with the result that tube 74 becomes non-conductive. Thereupon, the next positive pulse causes tube 74 to become conductive while tube 75 again becomes non-conductive. Thus, when a series 49 or 50 of input pulses is fed to the tube control grids, the anode circuit of tube 74 produces a series of rectangular waves 51a, 51b, or 53 while the anode of tube 75 produces a series of rectangular waves 52a, 52b, or 54.

Rectifier 56 includes a diode 90 which rectifies the rectangular waves 51a, 51b, or 53, the proper level of rectification being obtained by adjustment of potentiometer 87. Similarly, rectifier 57 incorporates a diode 91 which rectifies the rectangular waves 52a, 52b, or 54, the proper level of rectification being obtained by adjustment of potentiometer 89. As a result, the output of the rectifiers has the form shown in Figures 6g, 6h, 6n, and 6p.

Summing circuit and indicator 63 includes a pair of electron tubes 92 and 93 each having an anode, a cathode, and a control grid, the output of rectifier 90 being fed to the control grid of tube 92, and the output of rectifier 91 being supplied to the control grid of tube 93. Each tube has a grounded grid resistance 94 and is supplied with anode voltage from a positive power supply terminal 95 through a voltage dropping resistance 96. The cathodes of the tubes are connected to ground through the respective fixed resistances 97, 98 which are shunted by integrating condensers 99 and 100. A relay winding 101 is connected between the cathodes of tubes 92 and 93, this relay having a set 102 of contacts connected to terminals 103 and 104 which may lead to an indicator or to a control circuit for fuel or other operating variable of a reaction motor.

Figure 6N:
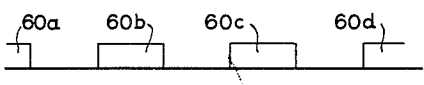
Figure 6F:
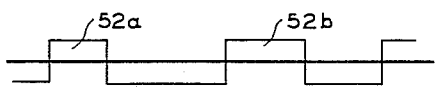
Figure 6P:
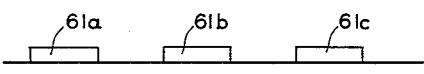
Figure 6G:
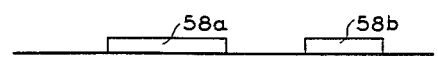
Figure 6R:

The circuit 63 adds the pulses 58, 59, or 60, 61 to produce a resultant voltage across the relay winding 101 which serves to maintain the relay in energized condition if the width of the two sets of pulses is different, the voltage across the relay winding being zero if the pulses are of equal width as in Figures 6n and 6p. Thus, the relay is energized as long as the pulses fed to the circuit have random spacing indicating normal operation of a reaction motor, the relay being de-energized when the pulses have uniform spacing corresponding to the existence of conditions of periodicity in the flame. The characteristics of the relay and of the resistance-capacitance circuits 97, 99, and 98, 100 are so adjusted that the relay is not de-energized until the periodic condition persists throughout a predetermined interval of time.

While the invention has been described in connection with a present, preferred embodiment thereof, it is to be understood that this description is illustrative only and is not intended to limit the invention, the scope of which is defined by the appended claims.

We claim:

1. The combination, with a reaction motor wherein a combustible mixture of fuel and air is burned to produce a flame, of a detector for producing a variable electrical output representative of flame intensity, and means for sensing periodicity in the variations of said electrical output.

2. The combination, with a reaction motor wherein a combustible mixture of fuel and air is burned to produce a flame, of a detector including a pair of spaced electrodes mounted in said motor at a region where a flame is present during normal operation of the motor, the electrical output of said detector thereby being representative of flame intensity, and means for sensing periodicity in the variations of said electrical output.

3. The combination, with a reaction motor having a compressor, a combustion chamber, and a turbine connected to drive said compressor, wherein air is compressed, then combined with fuel in said combustion chamber to produce a flame, and the products of combustion pass through and operate said turbine, of a detector including a pair of spaced electrodes mounted in said combustion chamber at a region where flame is present during normal operation of the motor, variations in flame intensity producing variations in the electrical output appearing between said electrodes, and means for sensing periodicity in the variations of said electrical output.

4. The combination, with a reaction motor wherein a combustible mixture of fuel and air is burned in a combustion chamber to produce a flame, and the products of combustion are passed through a flame-holder grid into an extension of the combustion chamber, of a detector including a pair of spaced electrodes mounted in said extension of the combustion chamber at a region where flame is present during normal operation of the motor, variations in flame intensity producing corresponding variations in an electrical output appearing between said electrodes, and means for sensing periodicity in the variations of the electrical output of said detector.

5. Apparatus in accordance with claim 2 wherein the means for sensing periodicity includes means for transforming the electrical output of said detector to electrical pulses representative of peak valves of flame intensity, a circuit for alternately initiating and terminating a voltage wave responsive to successive input pulses, means for producing two sets of rectified waves coincident in time with said voltage waves and the intervals between said voltage waves, respectively, and means for producing an output representative of the relative duration of said two sets of voltage waves.

6. Apparatus in accordance with claim 3 wherein the means for sensing periodicity includes means for transforming the electrical output of said detector to electrical pulses representative thereof, a circuit for alternately initiating and terminating a voltage wave responsive to successive input pulses, means for producing two sets of rectified waves coincident in time with said voltage waves and the intervals between said voltage waves, respectively, and means for producing an output representative of the relative duration of said two sets of voltage waves.

7. Apparatus in accordance with claim 4 wherein the means for sensing periodicity includes means for transforming the electrical output of said detector to electrical pulses representative thereof, a circuit for alternately initiating and terminating a voltage wave responsive to successive input pulses, means for producing two sets of rectified waves coincident in time with said voltage waves and the intervals between said voltage waves, respectively, and means for producing an output representative of the relative duration of said two sets of voltage waves.

8. Apparatus in accordance with claim 2 in which the output representative of the relative duration of said two sets of voltage waves is utilized to control an operating variable of the motor in such fashion as to suppress resonance.

9. Apparatus in accordance with claim 3 in which the output representative of the relative duration of said two sets of voltage waves is utilized to control an operating variable of the motor in such fashion as to suppress resonance.

10. Apparatus in accordance with claim 4 in which the output representative of the relative duration of said two sets of voltage waves is utilized to control an operating variable of the motor in such fashion as to suppress resonance.

References Cited in the file of this patent

UNITED STATES PATENTS

| Number | Name | Date |
|---|---|---|
| 1,535,240 | Morris | Apr. 18, 1925 |
| 2,109,222 | Ryder | Feb. 22, 1938 |
| 2,336,232 | Doran | Dec. 7, 1943 |
| 2,440,566 | Armstrong | Apr. 27, 1948 |
| 2,538,642 | Gardiner | Jan. 16, 1951 |
| 2,572,794 | Wild | Oct. 23, 1951 |
| 2,579,001 | Jeffers | Dec. 18, 1951 |